9052X
W. & J. D. Collins,
Washing Machine,
Patented Aug. 27, 1835.
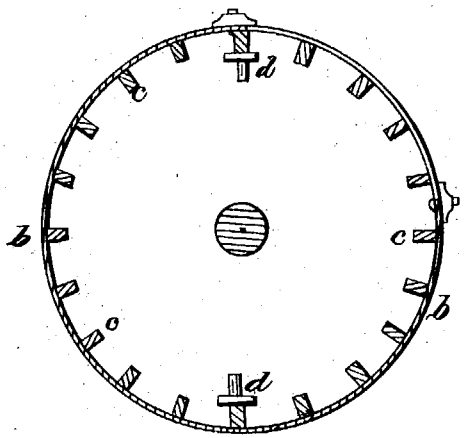
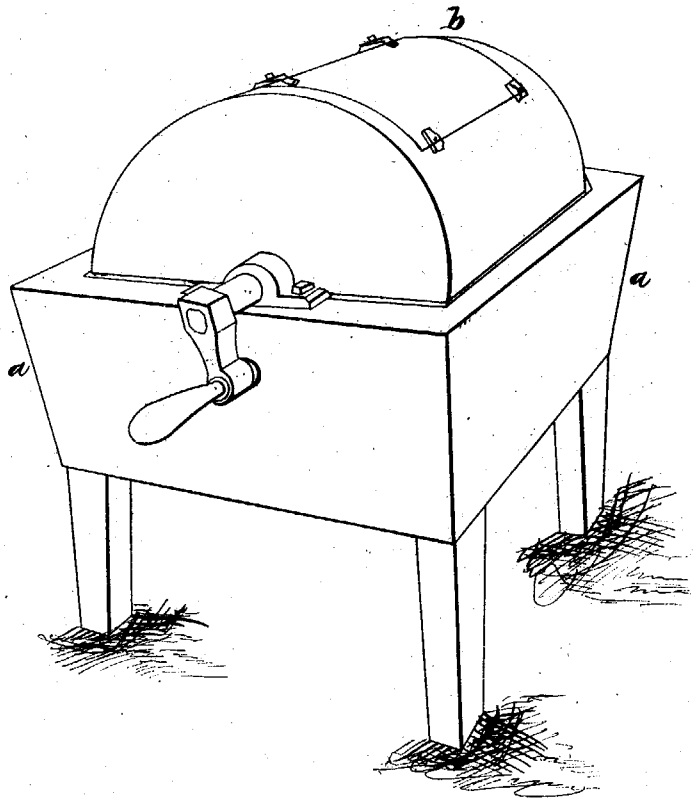
N. PETERS, PHOTO-LITHOGRAPHER, WASHINGTON, D. C.

Aug 27, 1835 9052X 157

William Collins and John D. Collins.

Letters Patent.

The Schedule referred to in these Letters Patent and making part of the same, containing a description in the words of the said William Collins and John D. Collins, themselves of their improvement in the Washing Machine.

To all to whom these presents shall come.

Be it known that we William Collins and John D. Collins of Norwich in the County of New London, and State of Connecticut have invented a new and useful improvement in the Washing Machine, and that the following is a full and exact description of the construction and operation of the said Machine as invented or improved by us. We make a box of boards of wood of suitable thickness and about twenty one inches square inside at the top, and about ten or more inches deep, the sides are set a little bevelling making the bottom about three or four inches narrower than the top, said box is placed on legs made of small sized scantling of such a height as is necessary to work with ease. In this box is placed a Cylinder about twenty or more inches long made with two heads of wood of suitable thickness, about twenty or inches diameter connected together with twenty or more slats or bars of wood or metal or any other suitable material sett edgeways to the centre three eighths of an inch thick by one inch wide, and two bars three inches wide and three fourths of an inch thick sett flat ways running from one head to the other on the outer edge or periphery the wide slats or bars are one opposite the other, with six pins three on each about three inches long by three fourths of an inch diameter projecting or towards the centre or inside of the cylinder; said cylinder is then covered with wood, zinc, or any other metal or material that will make cylinder water tight, a door is left to open on one side for the purpose of putting on Drawing Made in and taking out clothes and water, this door may be of any suitable size and kept shut by two or more small buttons. This cylinder revolves on two gudgeons made of iron or any suitable material with a flange on one end for the purpose of securing the gudgeons to the ends of the cylinder by means of wood screws or bolts on one gudgeon is fitted a crank or winch by means of which the cylinder is put in motion, this crank may be of wood or iron. When the machine is at work the cylinder is turned by the crank which carries the clothes to the upper side of the cylinder by means of the pins, from thence they fall to the bottom of the cylinder upon the narrow slats or bars in the water. What we claim as our inven=tion is the covering the cylinder as above described, setting the slats or bars edgewise, that is to the centre, and the principle of washing the clothes in the water, that is, putting the clothes and water together into the cylinder and shut them up tight while washing.

Exd. Witnesses
WJC Stephen Allen
Chas. Carpenter

William Collins
John D. Collins

[572 Words